United States Patent

Takeuchi et al.

[11] Patent Number: 5,236,335
[45] Date of Patent: Aug. 17, 1993

[54] FRONT-WHEEL STEERING SYSTEM

[75] Inventors: Kanji Takeuchi, Gamagori; Yousuke Setaka, Anjo, both of Japan

[73] Assignee: Nippondenso Co., Ltd., Kariya, Japan

[21] Appl. No.: 791,376

[22] Filed: Nov. 14, 1991

[30] Foreign Application Priority Data

Dec. 25, 1990 [JP] Japan .................................. 2-405820
Oct. 14, 1991 [JP] Japan .................................. 3-264994

[51] Int. Cl.$^5$ ............................................... B62D 5/04
[52] U.S. Cl. .................................... 180/79.1; 180/133
[58] Field of Search ...................... 180/79.1, 133, 141, 180/142, 143

[56] References Cited

U.S. PATENT DOCUMENTS 4,437,531 3/1984 Urabe ................................ 180/79.1
4,556,116 12/1985 O'Neil ............................... 180/79.1
4,573,545 3/1986 Kalns ................................ 180/79.1

FOREIGN PATENT DOCUMENTS 62-218268 9/1987 Japan .

Primary Examiner—Mitchell J. Hill
Attorney, Agent, or Firm—Cushman, Darby & Cushman

[57] ABSTRACT

A front-wheel steering system, which has a clearance between a steering shaft and a pinion shaft so that the two shafts will be out of contact when the relative angular position of these shafts is within the range of the angle $\theta_1$. A driving motor drives the pinion shaft 9 within the range of angle $\theta1$ and a mechanical clutch 8 transmits transmitting the driving torque of the driving motor to the pinion shaft 9. This mechanical clutch 8 is designed to be disconnected by the driver's steering power when the relative angle has exceeded the angle $\theta_1$.

15 Claims, 11 Drawing Sheets

FRONT-WHEEL STEERING SYSTEM

BACKGROUND OF THE INVENTION

1. Field of the Invention

The present invention relates to a front-wheel steering system and, more particularly, to a front-wheel steering system for controlling the steering angle of the front wheels of a vehicle using an electric motor, in accordance with the running condition of a motor vehicle.

2. Description of the Prior Art

There has been proposed an electric power steering system assisting a steering power by using an electric motor as disclosed in, for example, Laid-Open Japanese Patent Application No. 62-218268.

In this steering system, a steering shaft is connected with a pinion shaft, and the pinion shaft is in mesh with a rack tooth section of a rack shaft, thereby mechanically connecting a steering wheel to road wheels. Also in mesh with the rack shaft is a pinion shaft which is driven by the electric motor, assisting the steering power by the electric motor. The driving torque of this motor is transmitted to the pinion shaft through the reduction gear and an electromagnetic clutch. Connection and disconnection of the electromagnetic clutch are controlled by means of a control unit.

In the above-mentioned prior-art steering system, the electromagnetic clutch is disconnected at a high vehicle speed or in case of a trouble present in the control unit, allowing a vehicle driver to manually operate the steering system. The power-assistance ratio of the electric motor to the muscular effect of the driver for steering is typically around 10:1, and therefore the driving force of the electric motor is greater than the muscular force of the driver. If, therefore, the electric motor malfunctions, it is very difficult or impossible for the driver to operate the steering system. The prior-art steering system, therefore, is provided with an electromagnetic clutch for a fail-safe steering purpose, by which the electric motor is disconnected from the steering mechanism in the event of malfunction of the motor.

However, since the electromagnetic clutch is electrically driven by the control unit, it still has a reliability problem.

In the prior-art steering system described above, since the steering wheel and the front wheels are mechanically connected, it is imperative to depend on the manipulation of the steering wheel when controlling the steering angle of the front wheels. Accordingly, it is impossible to meet a demand to improve the driving stability of the vehicle by determining the steering angle of the front wheels in accordance with the driving condition of the vehicle.

SUMMARY OF THE INVENTION

It is, therefore, an object of the present invention to provide a front-wheel steering system capable of controlling the steering angle of the front wheels in accordance with the driving condition of the vehicle by use of an electric motor.

It is another object of the present invention to provide a front-wheel steering system improved in reliability for the control of the front-wheel steering angle by means of an electric motor.

In an attempt to accomplish the above-described objects, the front-wheel steering system according to the present invention comprises:

a driving condition detecting means for detecting the driving condition of the vehicle;

a steering shaft connected to a steering wheel and turning together with the steering wheel;

a steering wheel rotary motion detecting means for detecting the rotary motion of the steering wheel;

a steering mechanism which determines the steering angle of the front wheels of the vehicle, and is out of contact with the steering shaft when the front wheels are turned within a range of a first predetermined angle in relation to a steering angle corresponding to the amount of manipulation of the steering wheel, and when the steering angle has reached the first predetermined angle, the steering mechanism comes into contact with a part of the steering shaft, thus being driven in accordance with the manipulation of the steering wheel;

an electric motor for driving the aforesaid steering mechanism in accordance with a control signal supplied from outside;

a disconnecting means which is driven by a steering force applied to the steering wheel when the steering angle of the front wheels has reached a second predetermined steering angle which is less than the first predetermined steering angle, in relation to a steering angle corresponding to the amount of operation of the steering wheel, for disconnecting the steering mechanism from the electric motor; and a control means which outputs a driving signal to the electric motor in accordance with the rotary motion of the steering wheel detected by the steering wheel rotary motion detecting means, steers the front wheel correspondingly to the rotation of the steering wheel, and controls the steering angle of the front wheels in accordance with the driving condition of the vehicle detected by the driving condition detecting means within the range of the second predetermined angle.

Basically, because of the above-described constitution, the front wheels are steered in accordance with the manipulation of the steering wheel. Further, the steering angle of the front wheels is determined in accordance with the driving condition of the vehicle within the second predetermined angle from this steering angle.

Also, when the steering angle of the front wheels has reached the second predetermined angle in relation to a steering angle corresponding to the turn of the steering wheel, the steering mechanism is disconnected from the electric motor even when the electric motor has become uncontrollable due to the presence of, for example, noise. Thereafter, when the steering angle has reached the first predetermined angle, the steering shaft partly comes into contact with the steering mechanism, which in turn is driven by the manipulation of the steering wheel. Therefore the driver can perform steering operation in the event of a malfunction of the electric motor.

Many other features, advantages and additional objects of the present invention will become manifest to those versed in the art upon making reference to the detailed description which follows and the accompanying sheets of drawings.

DESCRIPTION OF THE PREFERRED EMBODIMENT

Hereinafter an exemplary embodiment of a front-wheel steering system according to the present invention will be described with reference to the accompanying drawings.

Figure 1:
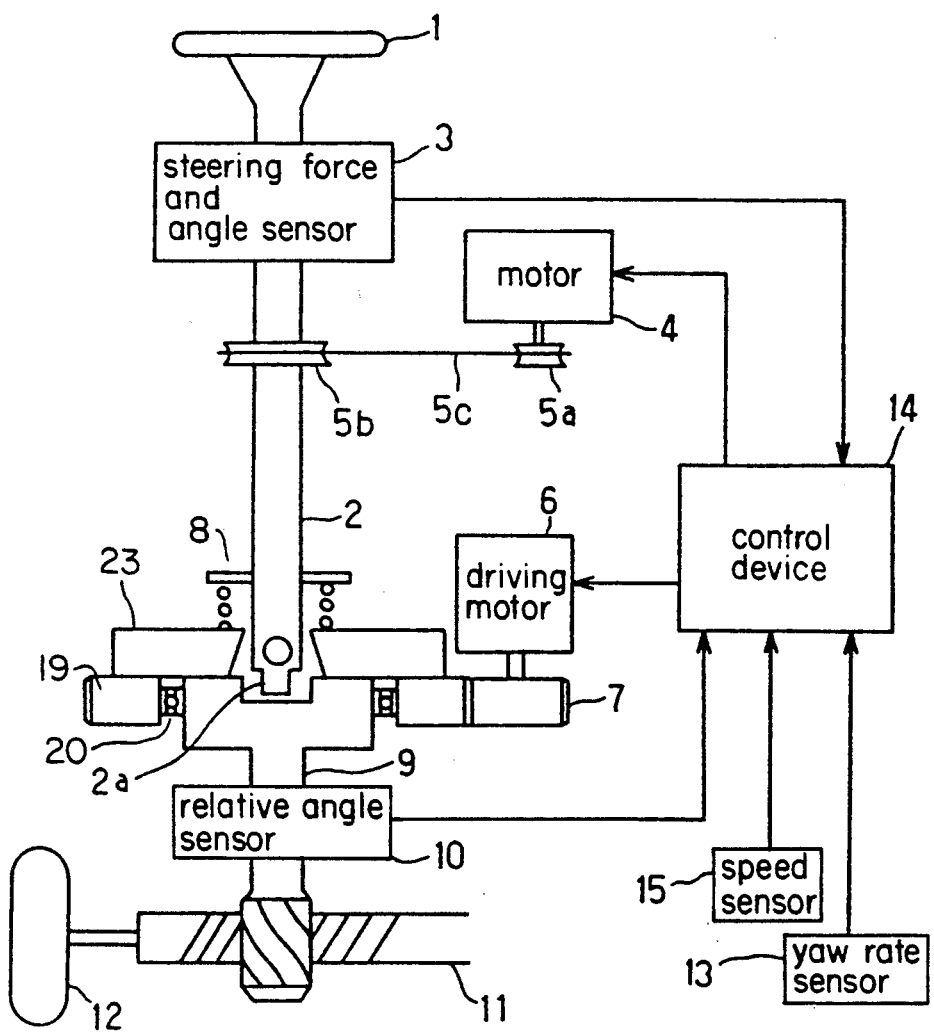
FIG. 1 is a block schematic diagram showing the constitution of one embodiment of the front-wheel steering system of according to the present invention.

FIG. 1 is a schematic block diagram showing the constitution of the front-wheel steering system of the present embodiment.

Steering wheel 1 is connected to a steering shaft 2, through a steering force and angle sensor 3, which senses a steering force exerted to the steering wheel 1 and a steering angle, and outputs an electric signal in accordance with values thus sensed. Pulley 5b is fixedly mounted on the steering shaft 2. This pulley 5b, together with a pulley 5a and a V-belt 5c, transmits the driving torque of a motor 4 for reaction force to the steering shaft 2. Driving motor 6 drives the steering mechanism which steers the front wheels 12 of the vehicle. An output shaft of this driving motor 6 is coupled with a final reduction gear 7, which is a known equipment that has a worm and a worm wheel and is connected to a pinion shaft 9 through a mechanical clutch 8. The pinion shaft 9 is driven to rotate by the driving motor 6. Details of this mechanical clutch 8 will be described later.

A relative angle sensor 10 is provided on the pinion shaft 9, to detect relative angle positions of the steering shaft 2 and the pinion shaft 9. A rack shaft 11 has rack teeth formed thereon to mesh with the pinion shaft 9 and is coupled with front wheels 12.

A control device 14 is a known electronic control device composed of ROM, RAM, CPU, etc., and functions to control steering angle and reaction force on the basis of detected values detected by a speed sensor 15 and a yaw rate sensor 13. These steering angle control and reaction force control will be described later.

Figure 2:
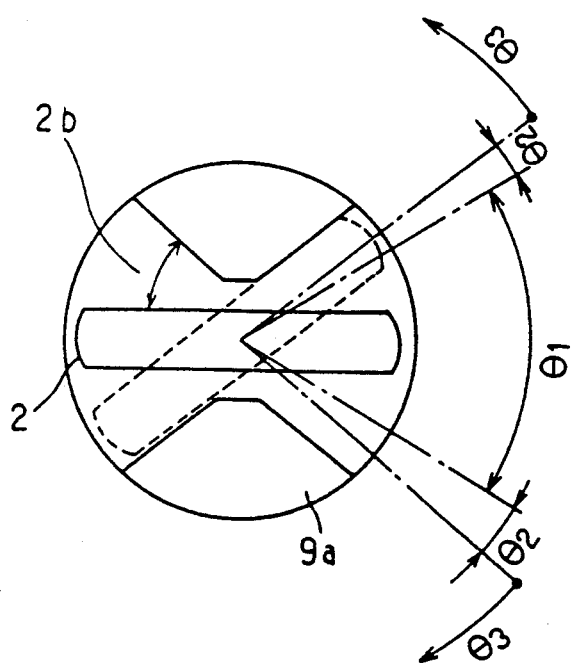
FIG. 2 is a plan view showing a positional relation between a steering shaft and a pinion shaft.

A top end of the steering shaft 2 closest to wheels 12 is inserted in a non-contact state in a recess section of the pinion shaft 9 of the steering mechanism, with their positional relation shown in FIG. 2. FIG. 2 shows, on the same plane, the positional relation of the steering shaft 2 and the pinion shaft 9. The top end of the steering shaft 2 furthest from wheels 12 is provided with a projection 2a has two flat surfaces defining a width therebetween. The pinion shaft 9 is provided with a projection 9a which functions as a mechanical stopper for the projection 2a of the steering shaft 2.

Between these two shafts is provided a clearance 2b as shown in FIG. 2. Steering operation can be classified into the following three operation modes by the relative positional relationship.

When the positional relation of the two shafts is within the range of the angle $\theta 1$, there is no mechanical connection between steering shaft 2 and the pinion shaft 9. In this state, the steering angle of the front wheels can be controlled by the driving motor 6 without mechanical manipulation by the steering wheel 1.

When the positional relation of the two shafts has come within the range of the angle $\theta 2$, however the mechanical clutch 8 is disconnected from the pinion shaft 9 by a steering force applied by the steering wheel 1 as will be described herein. In this state, the driving motor 6 can not control the steering angle of the front wheels 12.

When the positional relation of these shafts has reached the range of the angle F3, the lower end of the steering shaft 2 comes into contact with the projection 9a of the pinion shaft 9, thereby mechanically moving the steering shaft 2 and the pinion shaft 9 as one body to enable the steering of the front wheels 12 by the muscular power of the driver.

Figure 3:
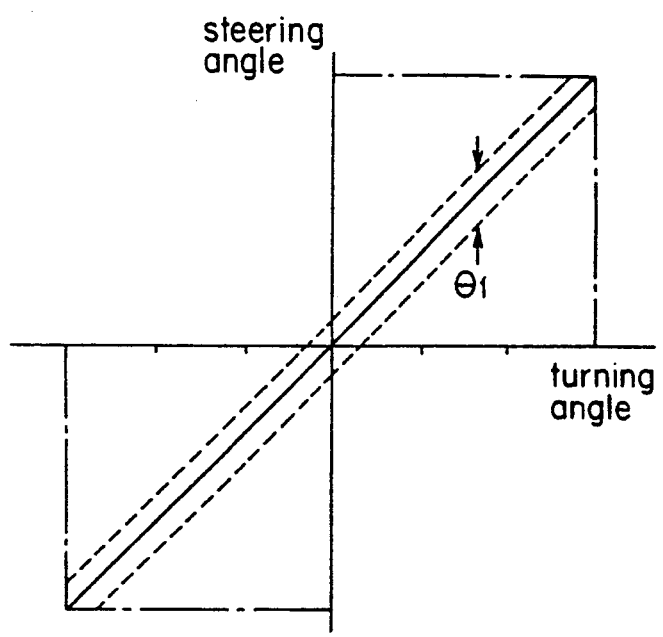
FIG. 3 is a characteristics view showing a relation between the turning angle of a steering wheel and a steering angle of front wheels.

Accordingly, the relationship between the turning angle of the steering wheel 1 and the steering angle of the front wheels 19 becomes as shown in FIG. 3. That is, it is possible to set the steering angle of the front wheels 12 to any optional value within the range of the angle $\theta 1$ from the steering angle of the front wheels 12, corresponding to the turning angle of the steering wheel 1.

Next, the operation and structure of the mechanical clutch 8 will be explained with reference to the sectional view in FIG. 4.

Figure 4:
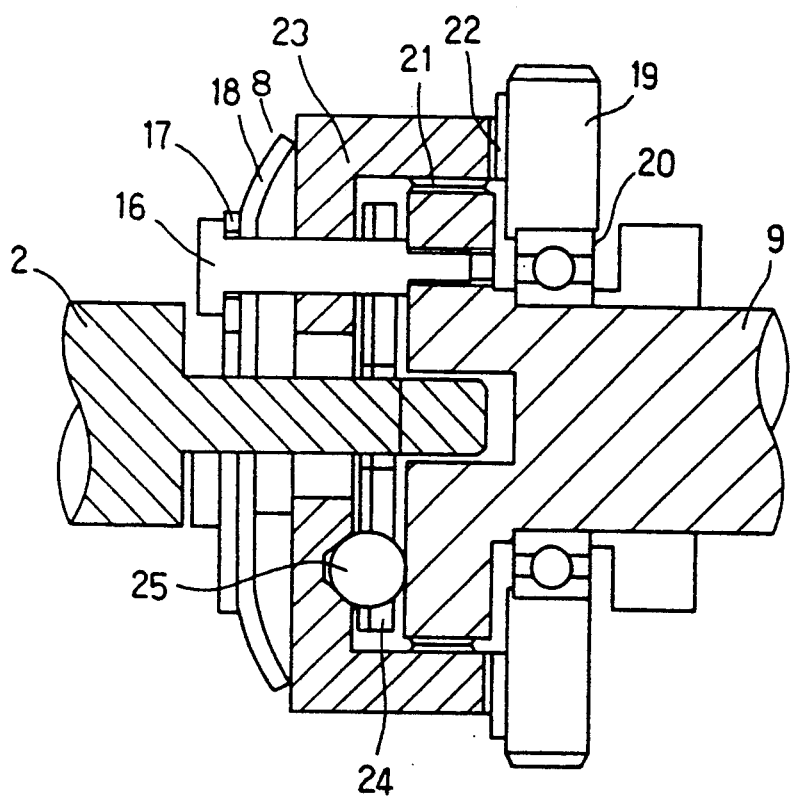
FIG. 4 is a sectional view showing the construction of a mechanical clutch.

FIG. 4 shows gear 19, which is axially driven to rotate by the driving motor 6 when connected with the final reduction gear 7. A bearing 20 rotatably supports the gear 19 on the pinion shaft 9. Since this gear 19 is connected with an armature 23 through a clutch section 22, the armature 23 is driven by the rotation of the gear 19. This armature 23 is connected to the pinion shaft 9 through a spline 21. Accordingly, the driving force from motor 6 via gear 19 is transmitted in the direction of rotation from the armature 23 to the pinion shaft 9 through this spline 21, enabling the pinion shaft 9 to move in the axial direction of the armature 23.

Figure 5A:
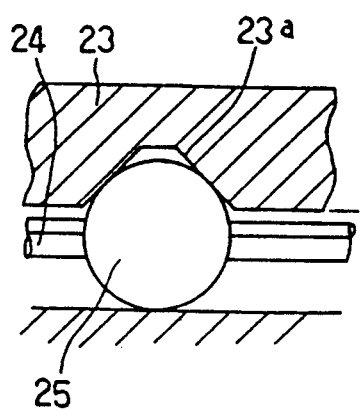
FIGS. 5A and 5B are explanatory views explaining the principle of the mechanical clutch.
Figure 5B:
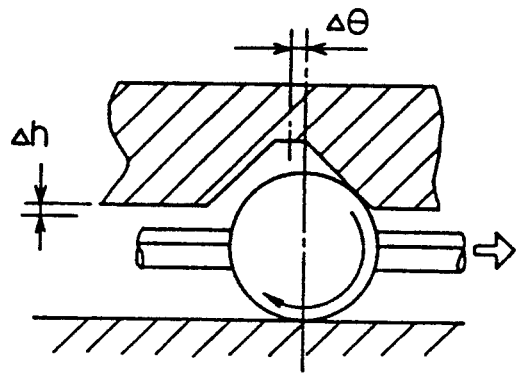

Bolt 16 is screwed into an extension of the pinion shaft 9 and holds a plate spring 18 and a plate 17 for retaining the plate spring 18. The plate spring 18, therefore, presses the armature 23 toward the gear 19, thus providing a transmission torque to be transmitted from the gear 19 to the armature 23 through the clutch section 22. Rotor 24 contacts the lower end of the steering shaft 2, and is driven to rotate when the positional relation between the steering shaft 2 and the pinion shaft 9 has reached the aforesaid angle $\theta 2$. Ball 25 is rotatably supported on the rotor 24, which turns with the rotation of the rotor 24, thereby pushing up the armature 23 toward the plate spring 18. FIG. 5 shows a plan view of this rotor 24.

Figure 6:
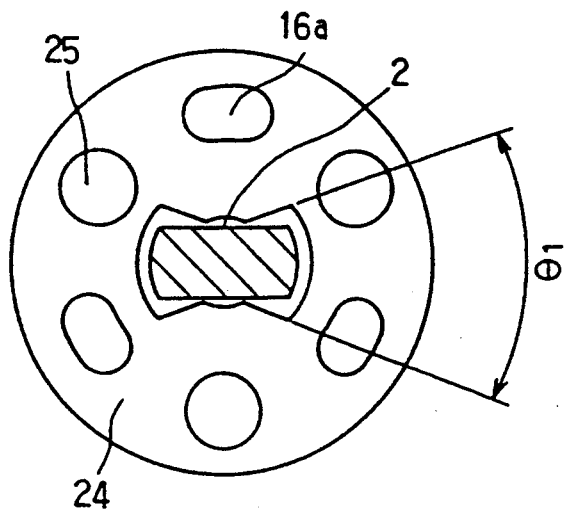
FIG. 6 is a plan view showing the configuration of a rotor of the mechanical clutch.

The principle of the mechanical clutch 8 of the above-described constitution will now be explained. The lower end of the steering shaft 2 which is inserted in the rotor 24 and the pinion shaft has a projection having width across flats as shown in FIG. 6. Usually, therefore, the steering shaft 2 is out of contact with the rotor 24 and out of contact with the pinion shaft 9. However, when the relative positions of the steering shaft 2 and the pinion shaft 9 have reached the angle $\theta_2$ over the range of the above-described angle $\theta_1$, the steering shaft 2 contacts the rotor 24 and this time, the rotor 24 starts rotating with the rotation of the steering shaft 2 because bolt 16 then contacts a surface of a long hole 16a in which the bolt 16 is inserted through as shown in FIG. 6.

The armature 23 is provided with tapered surfaces 23a in portions in contact with the ball 25 supported by the rotor 24, and is usually arranged so that the center of two tapered surfaces and the center of the ball 25 are aligned. However, with the rotation of the rotor 24 as described above, for example with the displacement of the armature 23 in the direction of the arrow in FIG. 5, the center of the ball 25 moves so that there is a displacement by $\Delta\theta$ from the center of the two tapered surfaces. The ball 25 is spherical, and can contact the plane only in a tangential direction. Therefore, as the ball 25 rotates, the armature 23 will be pushed in the upward direction of FIG. 5 which is leftward direction in FIG. 4 by $\Delta\theta$. Because of this axial displacement $\Delta\theta$ of the armature 23, the clutch section 22 becomes disconnected from gear 19 and hence from driving motor 6, and transmits no driving torque.

The taper angle of the tapered surfaces is set so to obtain a sufficient axial displacement $\Delta\theta$ to fully disconnect the clutch section 22 before the steering shaft 2 reaches the angle 83 of contact with the pinion shaft 9.

This clutch mechanism, as described above, is operated using the relative positions of the steering shaft 2 and the pinion shaft 9. In the event of any abnormal rotation of the driving motor 6, therefore, the clutch will automatically mechanically become disconnected from the driving motor 6, and the driver's steering operation will take precedence.

In the present embodiment, the tapered surfaces are provided merely on sides of the armature 23, but providing similar tapered surfaces on the pinion shaft 9 side can double the axial displacement ($\Delta\theta*2$).

In the present embodiment, the ball 25 is used for the purpose of decreasing friction, however in an alternate embodiment, a projection forming a mating tapered surface to the surface 23a of the armature 23 may be provided on the rotor 24 to replace the ball 25.

Next, operation of the front-wheel steering system of the present embodiment will be explained.

When the driver turns the steering wheel 1, the steering shaft 2 also rotates. The relative angle position of this steering shaft 2 and the pinion shaft 9 is detected by means of the relative angle sensor 10. The control device 14 computes a command value for supplying electric current to the driving motor 6, based on rotation of the steering wheel, so that the relative angle position will be in an intermediate position of the range of the angle 1. Furthermore, the control device 14 computes a desirable front-wheel steering angle, in consideration of the driving condition of the vehicle, on the basis of detected values from the speed sensor 15, the yaw rate sensor 13 and the steering force-angle sensor 3. The command value for supplying the electric current to the driving motor 6 will be corrected to drive the pinion shaft 9 within the range of the angle 1 in accordance with the steering angle thus computed.

A specific example of the steering angle control effected by the control device 14, with the driving condition of the vehicle taken into consideration, will be explained by referring to FIGS. 7 to 10.

Figure 7:
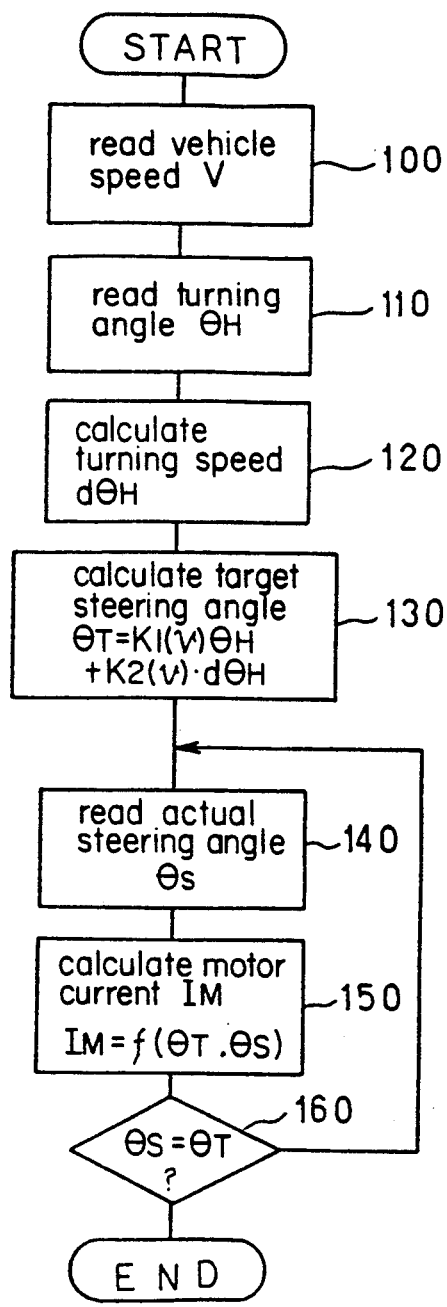
FIG. 7 is a flowchart showing one example of steering angle control.
Figure 8:
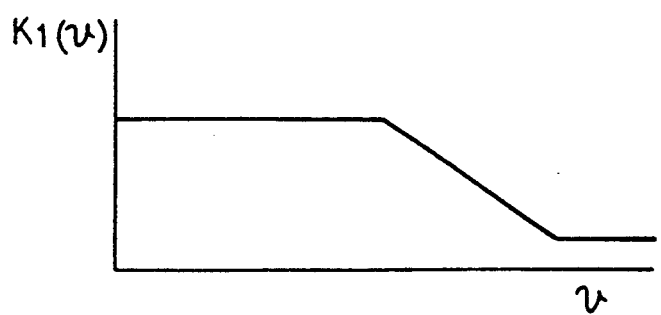
FIGS. 8 and 9 are characteristics views showing characteristics of coefficients $k_1(v)$ and $k_2(v)$ for calculation of a target steering angle $\theta_T$.
Figure 9:
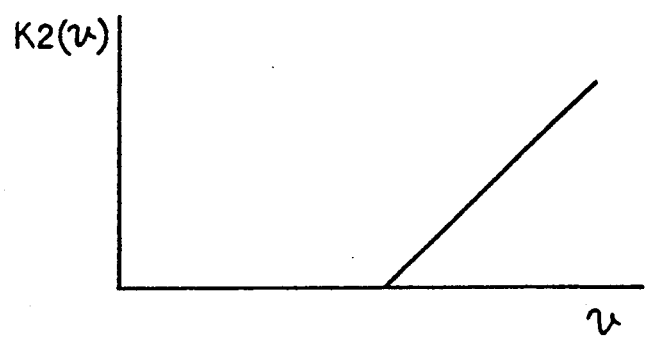

At Step 100 in the flowchart shown in FIG. 7, a detected signal from the speed sensor 15 is inputted to enter the vehicle speed v. At Step 110 a detected signal from the steering force-angle sensor 3 is inputted to read the turning angle $\theta_H$ of the steering wheel 1. At Step 120 the turning speed $d\theta_H$ is computed on the basis of a change in the turning angle $\theta_H$ entered at Step 110. At Step 130 a target steering angle $\theta_T$ is computed by the following equation on the basis of the vehicle speed v, the turning angle $\theta$ and the turning speed $d\theta_H$.

$$\theta_T = K_1(v)\theta_H + K_2(v)d\theta_H \qquad (1)$$

where $k_1(v)$ and $k_2(v)$ are variables which vary in accordance with the vehicle speed, the characteristics of which are shown in FIGS. 8 and 9.

A detected signal from the relative angle sensor 10 is inputted at step 140, and a actual steering angle $\theta_s$ is calculated by adding or subtracting the detected value to or from the turning angle $\theta_H$. A motor current $I_M$ is computed at step 150 by conducting a specific operation using feedback on the basis of the target steering angle $\theta_T$ and the actual steering angle $\theta_s$ so that the actual steering angle $\theta_s$ will approach the target steering angle $\theta_T$, and then this current is supplied to the driving motor 6. At Step 160, as a result of supply of the motor current $I_M$ to the driving motor 6, judgment is made to see if or not the actual steering angle $\theta_s$ coincides with the target steering angle $\theta_T$. When they coincide, the processing in this flowchart will be finished; when they do not, the processing from Step 140 to Step 160 will be repeated until they do.

As a result of the steering angle control described above, the rate of change in the steering angle of the front wheels 12 of the vehicle in relation to change in the turning angle $\theta_T$ of the steering wheel 1 will become lower during a high-speed travel of the vehicle. This is because the value of the variable $k_1(v)$ which is the coefficient of the turning angle $\theta_H$ is set to gradually decrease during high-speed operation as shown in FIG. 8. With the decrease in the variable $k_1(v)$, the variation in target steering angle $\theta_T$ thereby caused diminishes notwithstanding the variation in the turning angle $\theta_H$ of the steering wheel 1, and accordingly it is possible to improve driving stability during high-speed travel.

Hereinafter, variation in vehicle behavior resulting from the driver's manipulation of the steering wheel will be explained. For example, when the driver turns the steering wheel 1 during the straightforward travel of the vehicle, there is a time lag until the vehicle actually makes a turn after the manipulation of the steering wheel 1. This is due to inherent characteristics of the front wheels 12, which being elastic bodies, require some time before the steering angle of the front wheels 12 change. However, it is ideal that the steering angle of the front wheels 12 change in instant response to the driver's manipulation of the steering wheel, thereby improving steering performance.

In the above-described steering angle control, the turning speed $d\theta_H$ is used in addition to the turning angle $\theta_H$, as a parameter for calculation of the target steering angle $\theta_T$. Accordingly, the faster the turning speed $d\theta_H$ of the steering wheel 1, the larger the change of the target steering angle $\theta_T$. Therefore, it is possible to improve the speed with which the steering angle of the front wheels 12 responds to the driver's operation of the steering wheel and to reduce a delay of response to a change in vehicle behavior. The variable $k_2(v)$ which is the coefficient of the turning speed $d\theta_H$ is set such that the higher the vehicle speed increases over a specific value, the greater the variable becomes. This is because the higher the vehicle speed, the greater the effect to compensate for a time lag caused by the turning speed $d\theta_{HH}$.

Next, the details of processing other steering angle control will be explained on the basis of the flowchart in FIG. 10.

Figure 10:
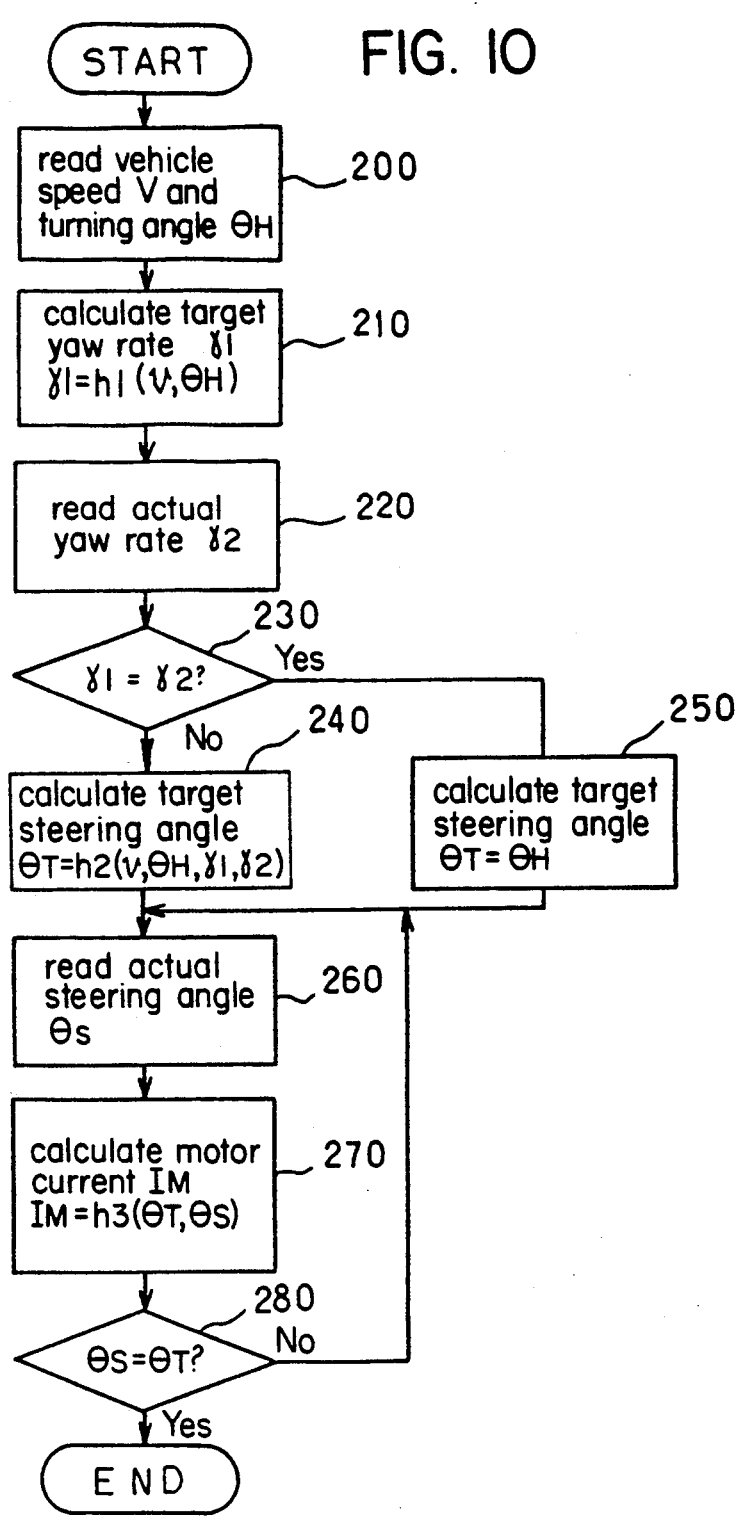
FIG. 10 is a flowchart showing another example of the steering angle control.

Step 200 of FIG. 10 receives detected signals from the speed sensor 15, and signals from the steering force-angle sensor 3 to obtain the vehicle speed v and the turning angle $\theta_H$ of the steering wheel 1. At Step 210, a target yaw rate $\gamma 1$ is computed on the basis of the vehicle speed v and the turning angle $\theta_H$ described above. The actual yaw rate $\downarrow 2$ is read at Step 220, as a detected signal from the yaw rate sensor 13. At Step 230, judgment is made to see whether or not the target yaw rate $\downarrow 1$ and the actual yew rate $\downarrow 2$ are equal. When these yaw rates are equal, the program proceeds to Step 250 where the present turning angle $\theta_H$ of the steering wheel 1 is set to the target steering angle $\theta_T$. When the yaw rates are not equal, the program proceeds to Step 240, where the target steering angle $\theta_T$ is computed on the basis of the vehicle speed v, the turning angle $\theta_H$, the target yaw rate $\downarrow 1$ and the actual yaw rate $\downarrow 2$ in order that the actual yew rate $\gamma 2$ will coincide with the target yaw rate $\gamma 2$. At Step 260, a detected signal from the relative angle sensor 10 is inputted and the detected value is added to, or subtracted from, the turning angle $\theta_H$, to calculate the actual steering angle $\theta_s$. At Step 270, a specific computation is effected on the basis of the target steering angle $\theta_T$ and the actual steering angle $\theta_s$ to bring the actual steering angle $\theta_s$ closer to the target steering angle $\theta_T$, thus calculating the motor current $I_M$ and supplying the motor current to the driving motor 6. At Step 280 a determination is made of whether the actual steering angle $\theta_s$ coincides with the target steering angle $\theta_T$ as a result of supply of the motor current $I_M$ to the driving motor 6. When these steering angles coincide, the processing in the flowchart will be finished. Conversely if they do not coincide, the processing from Step 260 to Step 280 will be repeated.

When an external disturbance, such as a side wind for example, has acted on the vehicle as a result of the steering angle control described above, the steering angle of the front wheels 12 will be controlled to cancel the yaw rate resulting from the external disturbance. Therefore, it is possible to improve the straightforward driving stability of the vehicle.

The control device 14 controls the steering angle described above as well as the reaction force because, in this system, the steering shaft 2 is commonly out of contact with the pinion shaft 9, and therefore it is necessary to give the restoring force to the steering wheel 1 in accordance with driving condition and road condition.

The reaction force control is basically performed by supplying the current IR to the motor 4 for reaction force parallel with the control current IM of the driving motor 6. That is, the current IR is given by the following equation.

$$I_R = K \times I_M \qquad (2)$$

where steering feeling can be changed with ease by changing the value of the current correction coefficient which is the coefficient of the control current $I_M$ in accordance with the vehicle speed v and the turning angle $\theta_H$ of the steering wheel.

Figure 11:
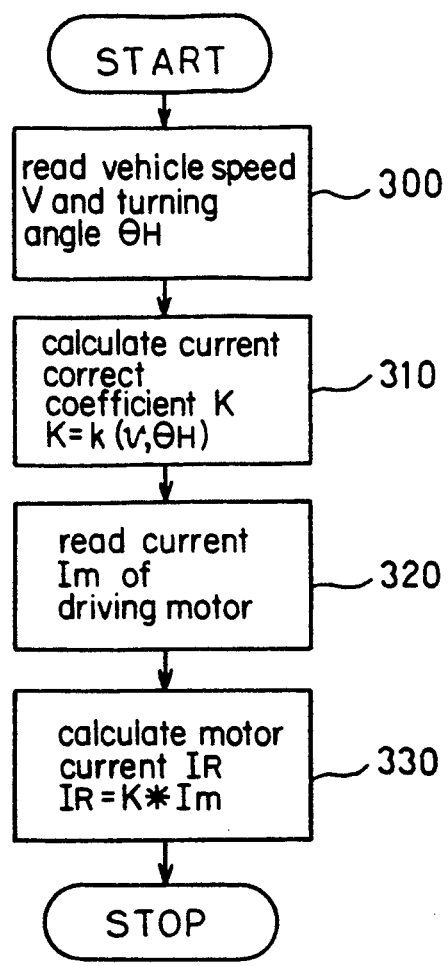
FIG. 11 is a flowchart showing one example of reaction control.

That is, as shown in the flowchart in FIG. 11, the vehicle speed v and the turning angle $\theta_H$ of the steering wheel are entered at Step 300, and the value of the current correction coefficient K is determined from these detected values at Step 310. At Step 320, the control current $I_M$ of the driving motor 6 is entered; and at Step 330, the current $I_M$ to be supplied to the motor 4 for reaction force is calculated on the basis of the current correction coefficient K and the control current $I_M$.

Here, at Step 310, it is possible to increase the rigidity of the steering wheel and to improve manipulation characteristics as well.

Figure 12:
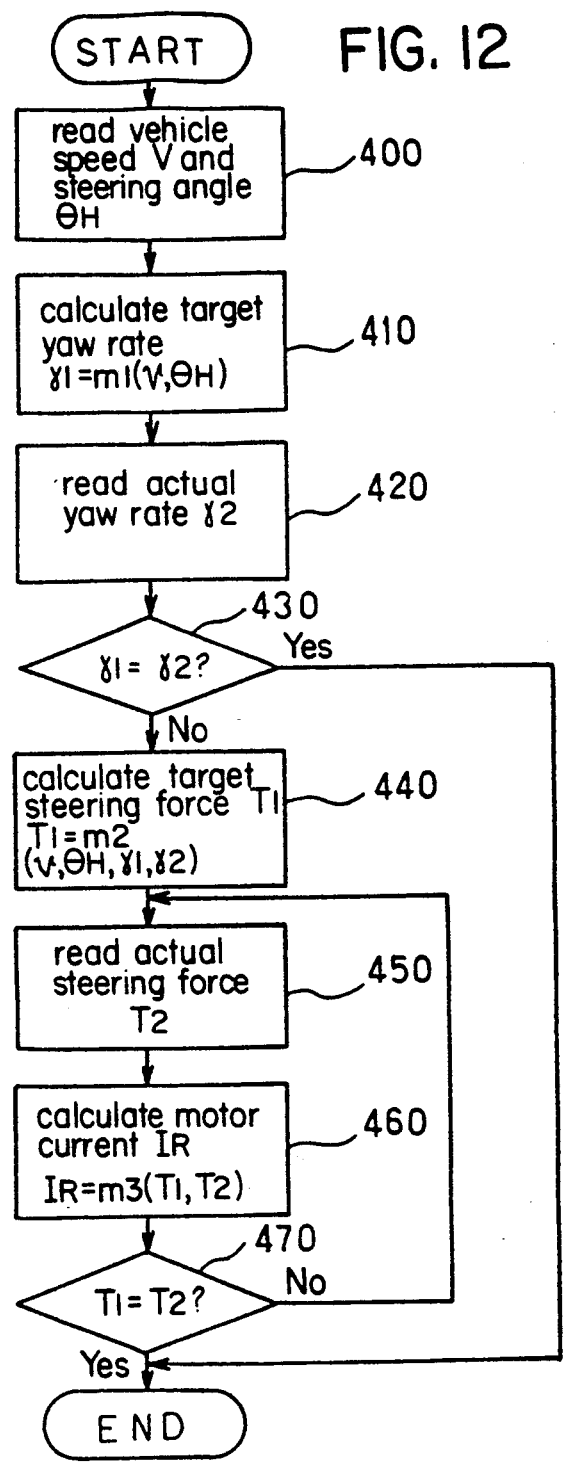
FIG. 12 is a flowchart showing another example of the reaction control.

As shown in the flowchart in FIG. 12, when there is a difference between the target yaw rate $\gamma 1$ and the actual yaw rate $\gamma 2$, the current $I_R$ to be supplied to the motor 4 for reaction force may be increased.

That is, a determination is made to see whether or not the target yaw rate $\gamma 1$ and the actual yaw rate $\gamma 2$ coincide, by performing a similar processing at Steps 400 to 430 to those carried out in the flowchart in FIG. 10. When these yaw rates do not coincide, the target steering force $T_1$ is computed at Step 440, and the actual steering force $T_2$ is inputted at Step 450. At Step 460, the value of the current $I_R$ to be supplied to the motor 4 for reaction force is determined to bring the actual steering force $T_2$ closer to the target steering force $T_1$. At Step 470, a determination is made to see whether the two values agree. If they do not agree, the processing from Step 450 to 470 is repeated. Performing the reaction force control stated above can prevent the driver's excessive steering, thus improving driving stability of the vehicle. Also by increasing the reaction force it is possible to give a warning to the driver.

The amount of this steering reaction force, having a common power assistance ratio of about 1:10, is sufficient if it is about one-tenth as great as the output torque of the driving motor 6. The motor 4 for reaction force may be a small-capacity motor capable of producing about one-tenth as great an output torque as the output torque of the driving motor 6. Since the output torque of the motor 4 for reaction force becomes less than the driver's maximum steering force, the driver's steering force always takes precedence, maintaining steering stability at all times.

In the present embodiment, the steering system therefore allows the driver to perform steering operation even in the event of malfunction of the motor 4 for reaction force.

Also in the present embodiment, the mechanical clutch 8 is between the final reduction gear 7 and the pinion shaft 9, but the mechanical clutch 8 may be installed between the driving motor 6 and the final reduction gear 7, by which the transmission torque of the mechanical clutch 8 can be reduced.

Figure 13:
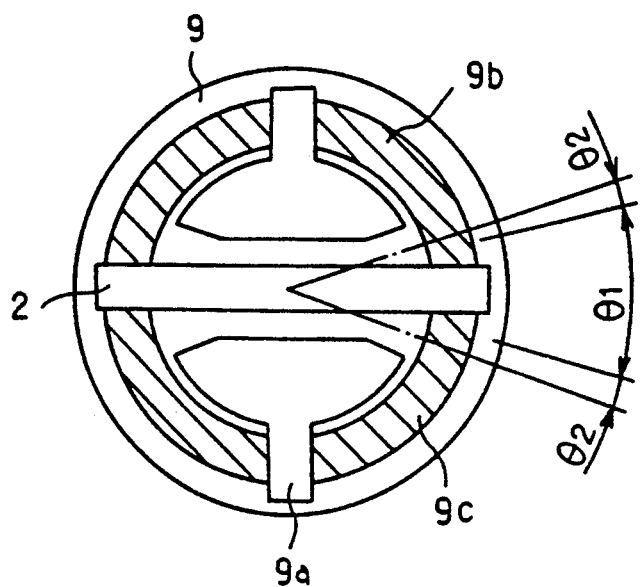
FIGS. 13A and 13B are block diagrams showing constitution for applying a reaction force to the steering wheel.
Figure 14:
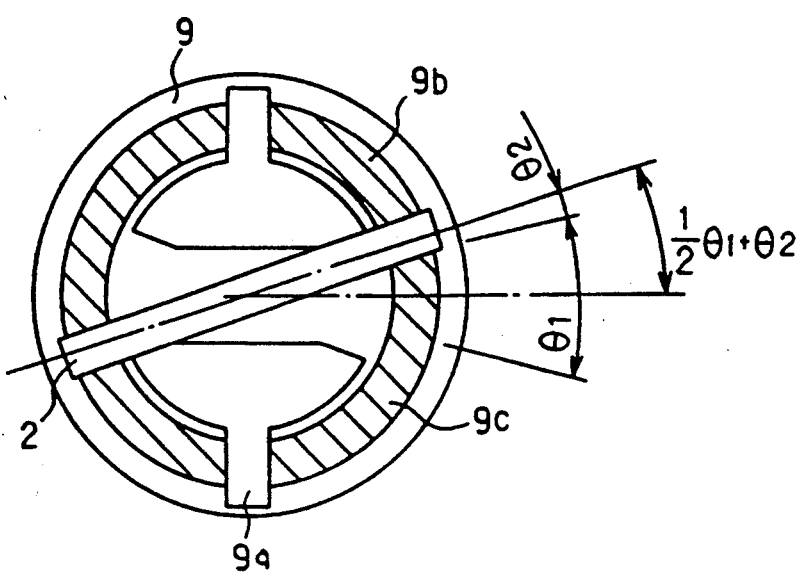

Further in the present embodiment, the motor 4 for reaction force is used to apply reaction force to the steering wheel. This motor 4 for reaction force may be removed, to simplify the constitution of the system. This alternative embodiment would be, as shown in FIG. 13, where elastic members 9b and 9c are inserted between the steering shaft 2 and the pinion shaft 9. FIG. 14 shows the system having the relative angle of $\frac{1}{2}\theta_1 + \theta_2$ between the steering shaft 2 and the pinion shaft 9. In this case, a reaction force is exerted to the steering wheel 1 due to the presence of a restoring force of the elastic member 9b in the direction of extension and a restoring force of the elastic member 9c in the direction of contraction. Consequently, it is possible to apply reaction force to the steering wheel 1 without using any motor 4 for reaction force.

While a preferred embodiment of the invention has been described using specific terms, such description is for illustrative purpose only, and it it to be understood that changes and variations may be made without departing from the spirit or scope of the following claims.

What is claimed is:

1. A steering system for controlling a steering angle of wheels of a vehicle, comprising:
    a steering shaft connected to a steering wheel and turning together with the steering wheel;
    detecting means for detecting an amount of manipulation of the steering wheel;
    a steering mechanism which is out of contact with the steering shaft when the front wheels are steered to an angle within a first predetermined angular difference between a steering angle corresponding to the amount of manipulation of the steering wheel and an angle of the wheels, and is in contact with the steering shaft and mechanically driven in accordance with the manipulation of the steering wheel when the steering angle of the front wheels are steered to an angle equal to or greater than the first predetermined angular difference;
    an electric motor for electrically driving the steering mechanism when the steering angle is less than the first angular difference;
    disconnecting means for mechanically disconnecting the electric motor from the steering mechanism just before the steering angle of the front wheels are steered to an angle at the first predetermined angular difference; and
    control means for generating a driving signal to the electric motor in accordance with the amount of manipulation of the steering wheel so as to control the steering angle of the wheel within the first predetermined angular difference.

2. A steering system as claimed in claim 1, wherein the steering shaft has a first projection at one end thereof, the first projection inserted in a recess formed in the steering mechanism, and a second projection as a mechanical stopper disposed in the recess of the steering mechanism at a position having a clearance corresponding to the first predetermined angular difference between said first and second projections,
    wherein when the steering angle of the wheels are steered to the first predetermined angular difference, the first and second projections contact one another so that the steering mechanism is mechanically driven by the manipulation of the steering wheel.

3. A steering system as claimed in claim 1, further comprising reaction force applying means for applying a steering reaction force to the steering wheel, the steering reaction force being determined on the basis of an amount of manipulation of the steering wheel.

4. A steering system as claimed in claim 3, wherein the reaction force applying means comprises a electric motor for outputting torque corresponding to inputed control signal,
    transmitting means for transmitting the torque of the electric motor to the steering shaft,
    outputting means for outputting the control signal to the electric motor, the control signal being determined in the basis of the manipulation of the steering wheel.

5. A steering system as claimed in claim 3, wherein the steering shaft has a first projection at one end thereof, the first projection inserted in a recess formed in the steering mechanism, and a second projection as a mechanical stopper disposed in the recess of the steering mechanism at a position having a clearance corresponding to the first predetermined angular difference between said projections,
    the reaction force applying means comprising an elastic member disposed in the clearance between the first and second projections for providing a reaction force for the steering wheel.

6. A steering system as claimed in claim 1, further comprising running condition detecting means for detecting a running condition of the vehicle,
    wherein the control means controls the steering angle of the wheels according to the running condition of the vehicle.

7. A steering system as claimed in claim 6, wherein the running condition is vehicle speed, running condition detecting means comprises a speed sensor detecting the vehicle speed,
    the control means reduces a change amount of the steering angle of the wheels against the amount of manipulation of the steering wheel, as the vehicle speed gets faster.

8. A steering system as claimed in claim 6, wherein the running condition is turning speed of the steering wheel, the running condition detecting means comprises turning speed detecting means for detecting the turning speed of the steering wheel,
    the control means enlarges the steering angle of the wheels against the amount of manipulation of the steering wheel, as the turning speed of the steering wheel gets faster.

9. A steering system as claimed in claim 6, wherein the running condition is vehicle speed and turning speed of the steering wheel, the running condition detecting means comprises a speed sensor detecting the vehicles speed and turning speed detecting means for detecting the turning speed of the steering wheel,
    the control means enlarges the steering angle of the wheels against the amount of manipulation of the steering wheel, as the turning speed of the steering wheel gets faster when the vehicle speed is more than a predetermined speed.

10. A steering system as claimed in claim 6, wherein the running condition is vehicle speed and yaw rate of the vehicle, the running condition detecting means comprises a speed sensor detecting the vehicle speed and yaw rate detecting means for detecting the yaw rate of the vehicle, the control means calculates a target yaw rate on the basis of the vehicle speed and the amount of manipulation of the steering wheel detected by the detecting means, and controls the steering angle of the wheels so that the yaw rate of the vehicle approaches the target yaw rate.

11. A steering system for controlling a steering angle of wheels of a vehicle, comprising:

a steering shaft connected to a steering wheel and turning together with the steering wheel;

detecting means for detecting an amount of manipulation of the steering wheel;

a steering mechanism which is out of contact with the steering shaft when the wheels are steered to an angle within a first predetermined angular difference between a steering angle corresponding to the amount of manipulation of the steering wheel and an angle of the wheels, and is in contact with the steering shaft and mechanically driven in accordance with the manipulation of the steering wheel when the steering angle of the front wheels are steered to an angle equal to or greater than the first predetermined angular difference;

an electric motor for electrically driving the steering mechanism when the steering angle is less than the first predetermined angular difference;

disconnecting means which is driven by a steering force applied to the steering wheel when the steering angle of the front wheels are steered to an angle at a second predetermined angular difference which is less than the first predetermined angular difference, for mechanically disconnecting the electric motor from the steering mechanism; and control means for generating a driving signal to the electric motor in accordance with the amount of manipulation of the steering wheel so as to control the steering angle of the wheels within the second predetermined angular difference.

12. A steering system as claimed in claim 11, wherein the disconnecting means comprises an armature connected to the electric motor for transmitting a output torque of the electric motor to the steering mechanism, the steering shaft passing through the armature without contacting thereto, spring means for pressing the armature toward the steering mechanism, a rotor disposed between the armature and the steering mechanism for rotating together with the steering mechanism, the rotor having a hole through which the steering shaft passes, and is in contact with the steering shaft when the steering angle of the wheels are steered to an angle at the second predetermined angular difference and the rotor rotatably supporting a ball member, the armature having a recess at a position within which the ball member of the rotor faces, such that when the ball member is in the recess the armature is spaced from the rotor by a predetermined amount, the ball member being biased out of the recess of the armature so that the armature is pushed against a pressure of the spring means and separated from the rotor by an amount greater than the predetermined amount by the ball member, and a connection between the armature and the electric motor is thereby disconnected, when the hole of the rotor is in contact with the steering shaft and the rotor rotates together with the steering shaft.

13. A steering system as claimed in claim 11, wherein the disconnecting means comprises a mechanical clutch transmitting a rotation of the electric motor to the steering mechanism, and separating means for separating the mechanical clutch by using a rotational force of the steering shaft.

14. A steering system for controlling a steering angle of wheels of a vehicle, comprising:

a steering shaft connected to a steering wheel and turning together with the steering wheel;

detecting means for detecting an amount of manipulation of the steering wheel;

a steering mechanism, which is mechanically separated from the steering shaft and coupled to the wheels, for sensing the steering angle of the wheels;

an electric motor for electrically driving the steering mechanism;

control means for generating a driving signal to the electric motor in accordance with the amount of manipulation of the steering wheel;

changeover means for determining a condition of steering, and for controlling the electric motor to drive the steering mechanism when a first steering condition is determined and disconnecting a connection between the electric motor and the steering mechanism and mechanically contacting the steering shaft with the steering mechanism so that the steering mechanism can be manually steered when a second steering condition is determined.

15. A steering system as claimed in claim 14, wherein said condition is an angular difference between a steering angle corresponding to the amount of manipulation of the steering wheel and an angle of the wheels determined by the steering mechanism, wherein the changeover means comprises first means for controlling the electric motor to drive the steering mechanism when the angular difference is less than a predetermined angular difference and second means for disconnecting a connection between the electric motor and the steering mechanism and mechanically contacting the steering shaft with the steering mechanism so that the steering mechanism can be manually steered when the angular difference is more than a predetermined angular difference.

* * * * *